United States Patent [19]
Kenney et al.

[11] Patent Number: 5,569,835
[45] Date of Patent: Oct. 29, 1996

[54] REFERENCE WIRE COMPENSATION METHOD AND APPARATUS

[75] Inventors: Martin J. Kenney, Sandpoint, Id.; John K. Billings, Snohomish, Wash.

[73] Assignee: Ultrasonic Arrays, Inc., Woodinville, Wash.

[21] Appl. No.: 522,760

[22] Filed: Sep. 1, 1995

Related U.S. Application Data

[63] Continuation of Ser. No. 288,299, Aug. 10, 1994, abandoned.

[51] Int. Cl.⁶ .......................... G01N 21/86; G01N 37/00
[52] U.S. Cl. ........................ 73/1 J; 356/381; 364/563; 364/571.04; 364/571.05
[58] Field of Search .................... 73/1 J; 250/252.1; 271/227, 253, 254; 356/379–387; 364/563, 571.01, 571.02, 571.03, 571.04, 571.05

[56] References Cited

U.S. PATENT DOCUMENTS

| | | | |
|---|---|---|---|
| 3,348,057 | 10/1967 | Burroughs | 356/400 |
| 3,750,461 | 8/1973 | Felix | 73/597 |
| 4,047,029 | 9/1977 | Allport | 364/563 |
| 4,276,480 | 6/1981 | Watson | 356/381 |
| 4,400,089 | 8/1983 | Farabaugh | 73/1 J |
| 4,823,590 | 4/1989 | Kniest et al. | 73/1 J |
| 4,955,225 | 9/1990 | Kniest et al. | 73/1 J |
| 5,001,356 | 3/1991 | Ichikawa | 356/381 |
| 5,210,593 | 5/1993 | Krämer | 356/381 |

FOREIGN PATENT DOCUMENTS

| | | | |
|---|---|---|---|
| 60-57203 | 4/1985 | Japan | 356/382 |
| 221605 | 9/1989 | Japan | 356/381 |
| 313705 | 12/1989 | Japan | 356/381 |
| 314907 | 12/1989 | Japan | 356/381 |
| 302606 | 12/1990 | Japan | 356/382 |
| 116409 | 4/1992 | Japan | 356/381 |
| 15733 | 10/1991 | WIPO | 73/1 J |

Primary Examiner—Hezron E. Williams
Assistant Examiner—Daniel S. Larkin
Attorney, Agent, or Firm—Dowrey & Associates

[57] ABSTRACT

A scanning system for monitoring the thickness, profile or other data from a moving product which includes a frame for mounting scanning transducers. The product is carried on a conveyor or the like through the frame and the transducers are mounted for transverse scanning motion across the top and bottom surfaces of the product at right angles to its direction of travel. Reference wires are connected between the side members of the frame and maintained at a constant tension independent of ambient temperatures. Reference wires are located between the transducers and both the top and bottom surfaces of the product. The wires provide a constant reference to detect distortion of the frame due to thermal or other stress and to provide correction data which is used to compensate for frame irregularities.

18 Claims, 3 Drawing Sheets

REFERENCE WIRE COMPENSATION METHOD AND APPARATUS

This is a Continuation of application Ser. No. 08/288,299 filed Aug. 10, 1994 now abandoned.

BACKGROUND OF THE INVENTION

1. Field of the Invention

The present invention relates to the inspection and monitoring of moving materials, as for instance on a conveyor or the like, during the production process for thickness, profile or other quality control data. More particularly the invention relates to a method and apparatus for providing a reference standard which may be used to compensate for displacement of the elements of a scanning frame or fixture due to thermal or other stress. The present invention contemplates the use of a reference wire or wires which extend between the scanning frame members and which are maintained under constant tension and hence constant configuration, regardless of changes in the ambient temperature or temperatures of the product being scanned.

2. Description of the Prior Art

Prior art methods and apparatus for scanning a moving piece of material such as a web or panel are well known and are used for quality control to monitor for example the thickness, width or other dimension of the product. Some systems are also designed for monitoring properties such as surface texture, density, mass and quality of the product. Although some systems utilize devices which actually contact the material surface, most systems utilize one of the many known non-contact methods with sensors employing a wide range of energy beams or waves including light, sound, electrical current, and particle transmission or absorption.

Regardless of the type of sensor utilized, initial calibration and constant adjustment is usually necessary in order to maintain quality monitoring and accurate measurements. The character of the initial calibration and the need for adjustment or recalibration usually depends on the type of material being monitored, the design of the fixture and the scanning environment which may introduce factors such as physical vibrations or extreme variations in temperature. The need for adjustment and recalibration will also be dependent somewhat upon the nature and sophistication of the sensors themselves. U.S. Pat. No. 5,327,770 to Hindle is an example of prior art scanning systems wherein a sensor or an array of sensors is mounted for transverse movement relative to the direction of flow of material for sampling a web or like. In the Hindle system a primary scanner scans off the edge of the moving product and scans a sample of the same material of known characteristics for periodically updating its calibration. The primary scanner then uses a correction signal to recalibrate secondary scanners. The specification of the Hindle patent also discusses a prior art embodiment, GB-A1,378,303 which addresses the problem of thermal stress correction by splitting a light beam so that a portion is directed into a stationary detector while another passes through a moving web. An attempt is made to correct the errors caused by thermal stress and bending of supporting structures. The reference signal is then used for measurement purposes only and not calibration.

Other prior art devices teach various methods for calibrating and updating energy beam sensors. U.S. Pat. No. 3,750,461 to Felix for instance is a system wherein the ultrasonic sensors are calibrated with a separate reference system of known qualities. U.S. Pat. No. 4,400,089 to Farabaugh discloses a method and apparatus for determining the optical quality of an article by scanning it for thickness, among other properties, through the use of non-contacting "energy beams" which are calibrated by imposing a calibration thickness signal. U.S. Pat. No. 3,531,977 to Chaskelis et al. employs an electronic reference block which electronically simulates the standard test blocks used in the past as a reference. U.S. Pat. No. 4,476,549 to Dragonette et al. relates to calibrating acoustic backscattering instrumentation utilizing a spherical body as a standard target. In U.S. Pat. No. 4,660,419 to Derkacs et al., ultrasonic transducers are calibrated for detecting flaws in pipe or tubular objects by the use of a calibration cylinder having predetermined calibration flaws.

Although the discussed prior art devices have developed effective means for initial calibration and updating, the calibration of energy waves and beam-sensors, the common problem of measurement errors caused by thermal expansion and contraction (thermal stress) have continued to be a serious source of error. In many situations measurements are taken where either the ambient temperature is elevated or the product being measured is in a hot condition. The temperature may not only be extreme but may continuously vary and, although the sensors are originally correctly calibrated, constant error is introduced. Any calibration reference, such as those discussed, which is also subject to the ambient temperature changes would not serve to alleviate this problem.

The problem of distortion due to thermal stress is most pronounced in systems utilizing support frames or "fixtures" for mounting the sensors. The support frame members mounting the sensors are caused to move and distort, introducing error by changing the distance between the sensor head and the material being scanned and/or the distance between the sensors. These fixtures or frames are commonly either O-frames or C-frames, so called because of their configuration. The frame, however, could be any other arrangement of beams which support a sensor or an array of sensors. During thermal expansion, the parallel members of the O-frame or C-frame, which mount the scanning sensor heads, will be displaced sufficiently to displace the heads and will lose their parallelism, introducing error into the measurements.

The present invention seeks to alleviate the problem of thermal expansion by providing a constant reference member for the sensor heads which is itself independent of the influence of ambient temperatures. In this manner, readings may be taken on the reference member or members to obtain a correction signal which is added to the measurement signal to compensate for the effect of thermal stress or other factors that cause distortion of the frame members are displacement of the sensors.

SUMMARY OF THE INVENTION

According to the present invention, a constant reference point or base line for a sensor means such as an energy beam transducer or an array of transducers is provided and a temperature correction or compensation signal is applied to produce accurate measurements. According to the present invention, a tensioned wire is connected between frame members and is kept at a constant tension and hence constant configuration, independent of changes in ambient temperature. In the typical installation, a traversing pair of sensors is supported, one above and one below the material being scanned as for instance on a moving conveyor. In this instance, a first constant tension reference wire is mounted between the sensors and the top surface of the product and a second reference wire is mounted between the lower set of sensors and the bottom of the product.

In scanning systems of the type under consideration, the thickness of the product is measured by subtracting the distance from the top transducer to the top of the product and the distance from the bottom transducer to the bottom of the product from a constant that represents the distance between the transducers at the time the measurement was taken. The transducer separation is not constant, however, unless the rails upon which the transducers are mounted are absolutely parallel and resistant to thermal expansion and contraction. Since this is not the case, the reference wires of the present invention serve to introduce a source of constant reference. The reference wires are used as a reference point in space to detect any change in the separation of the transducers, due to frame movement. The wires must be mounted so that the separation between them changes very little with temperature and frame vibration. If both wires move the same amount in the same direction the changes will cancel each other out. In accomplishing the correction method of the present invention the initial position of the wires relative to the transducers and the frame spacing along the scanning path are "mapped" and stored in a signal processor. These measurements are later used to compare with measurements taken during monitoring an unknown product to provide an adjustment to compensate for any frame irregularities without stopping production of the product.

DETAILED DESCRIPTION OF THE PREFERRED EMBODIMENTS

Figure 1:
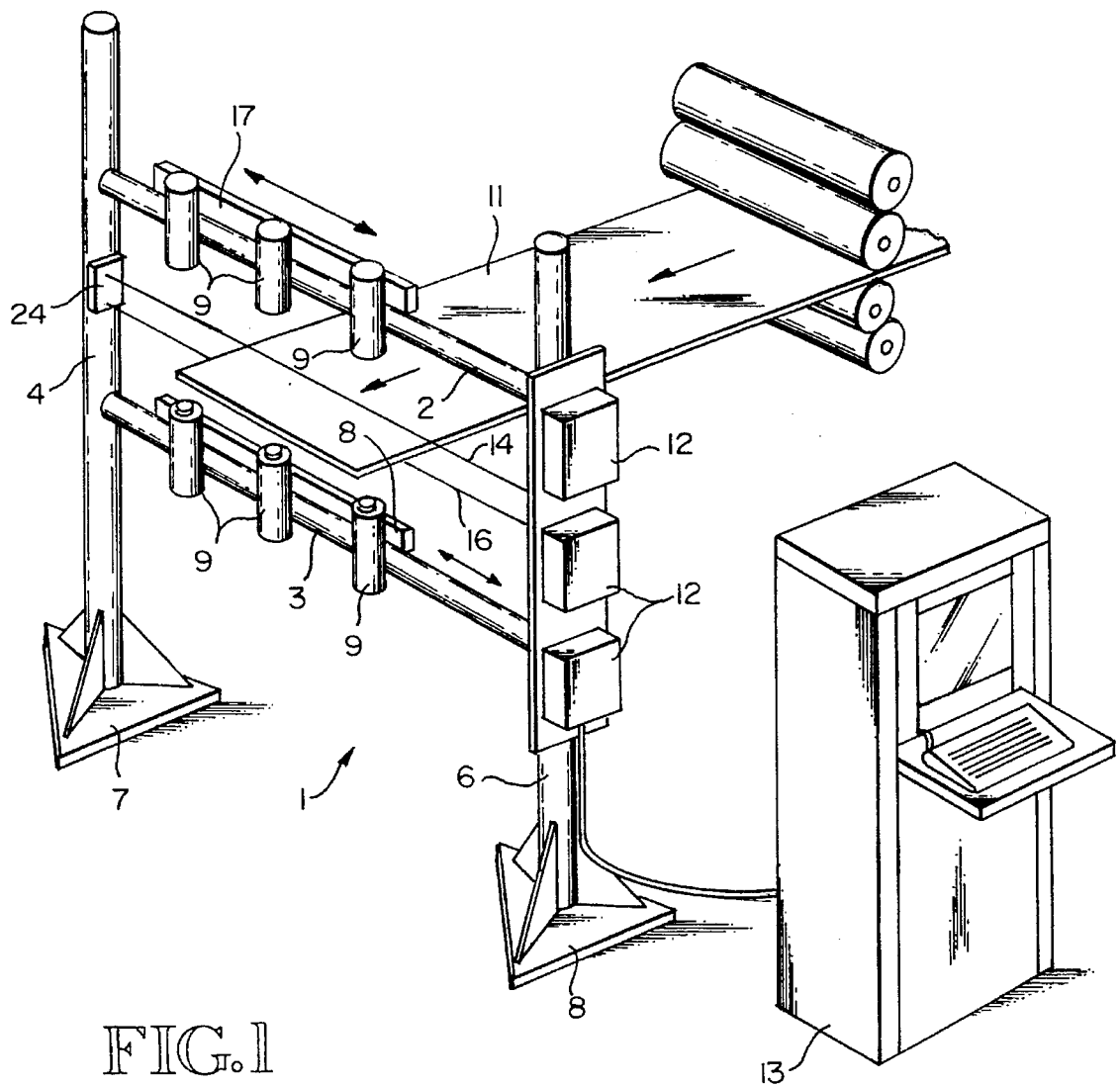
FIG. 1 is perspective view of the schematic of a scanning O-frame on a continuous product line.

Although the preferred embodiment of the invention will be described relative to a particular type, number and arrangement of sensors or transducers it will be apparent that the invention is equally applicable to many variations in sensor details and arrangements. Likewise, while the present preferred embodiment is described utilizing a scanning O-frame it will be apparent to those skilled in the art that other variations and frame arrangements or "fixtures" such as C-frames and even single beam supports are within the purview of the invention. Referring to FIG. 1, the O-frame is indicated generally at 1 and is so called because of its closed configuration. The frame comprises top and bottom tubular frame members 2 and 3 respectively and the two vertical side sections 4 and 6 respectively which are formed by the upright support posts with rigid floor engaging support bases 7 and 8 respectively. The base plates are used to stabilize and level the scanning O-frame as much as possible against machine vibration and the like. The top and bottom tubular frame members 2 and 3 respectively provide parallel rigid mounting and support guides for the transducer holders 9 which, as will presently be described, are mounted for transverse scanning in a direction at right angles to the flow of the product 11, in the direction indicated by the arrows in FIG. 1. In this regard it is to be understood that the illustrated embodiment is only one of several possible scanning arrangements which may be adopted for use in the preferred embodiment of the invention. For instance, the arrangement in FIGS. 1 and 2 could be operated as a fixed 3-zone system or only a single pair of scanning sensors (top and bottom) could be mounted on the tubular frame member 2 and 3 or any form of track carried thereby. With the arrangement illustrated, the product 11 moves between top and bottom pairs of the transducer or sensor heads mounted in the holders 9. Each pair of transducers may be termed a "gauge" in the present embodiment, the signals from which are combined to obtain thickness measurements as the sensors scan across the top and bottom surfaces of the product. In some installations, however, a single transducer may also comprise a "gauge". The electronic controls may be located in the housings 12 on one of the vertical upright members with a control console 13 being located for use by an operator.

A top reference wire 14 extends and is tensioned between the side sections 4 and 6 of the O-frame and positioned between the top transducers and the top surface of the product 11. Similarly a bottom reference wire 16 extends and is tensioned between the upright sections 4 and 6 and is positioned between the bottom transducer and the bottom surface of the product 11. While the present preferred embodiment discloses the use of wire reference members, it will also be understood that other configurations may be used such as a thin ribbon or the like.

Figure 2:
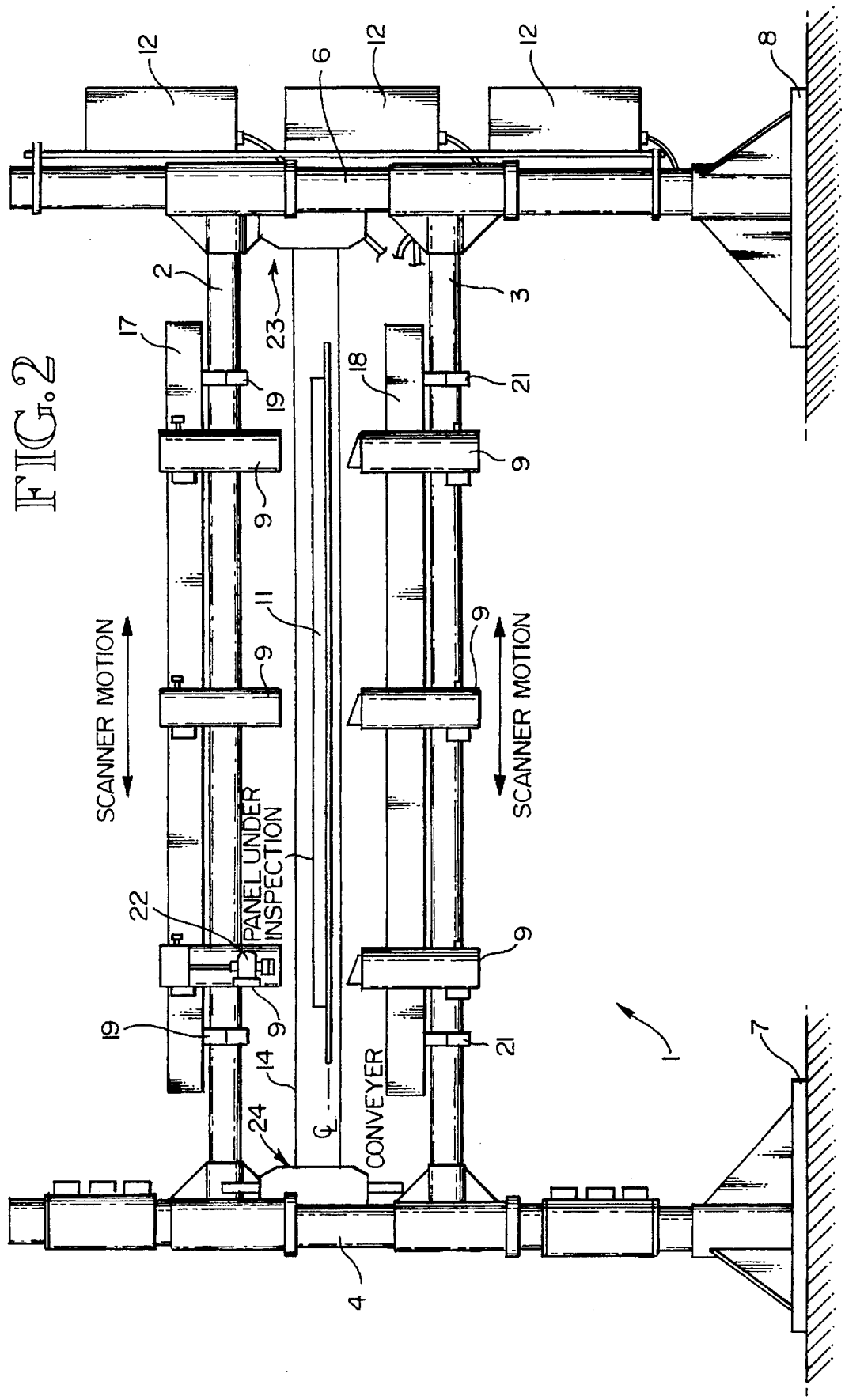
FIG. 2 is an end elevation of a scanning O-frame.

Referring to FIG. 2 the top and bottom transducer holders 9 are mounted on a top and bottom beams 17 and 18 respectively such that the transducers are moved in unison in a transverse scanning path adjacent to the top and bottom surfaces of the product. The product in this case is illustrated as a panel 11 under inspection. The beams 17 and 18 may be mounted for linear transverse movement on the tubular members 2 and 3 respectively by suitable carriages 19 and 21 respectively. It will be understood that the carriages 19 and 21 are provided with linear bearings (not shown) for engaging the tubular members and may be driven by servo motors or by any suitable driving arrangement. As previously mentioned the number of transducers or sensors mounted on each carriage may be varied according to any particular installation which could also comprise a single transducer or pair of transducers.

As illustrated in FIG. 2, each transducer holder 9 mounts a transducer unit or sensor head 22. As previously described, the sensors may be any one of many known and commercially available types of scanner units. Various scanning and measuring techniques may include lasers, ultrasound, nuclear or radiant energy, eddy current, infrared rays, beta-particle or gamma-particle sensors, optics and capacitance sensors. With the arrangement illustrated in FIG. 2, the carriages 19 and 21 move the beams 17 and 18 in a transverse direction at right angles to the movement of the panel 11 to accomplish the scanning. The reference wires 14 and 16 extend between the vertical sections 4 and 6 of the O-frame and, in the present embodiment, are anchored at the right side of the O-frame on the vertical section 6 and are connected for tensioning at the left hand side of the frame on the vertical section 4. An anchor plate 23 is mounted on the vertical section 6 of the O-frame and the wire tensioning unit 24 is mounted on the upright section 4 of the O-frame.

Figure 3:
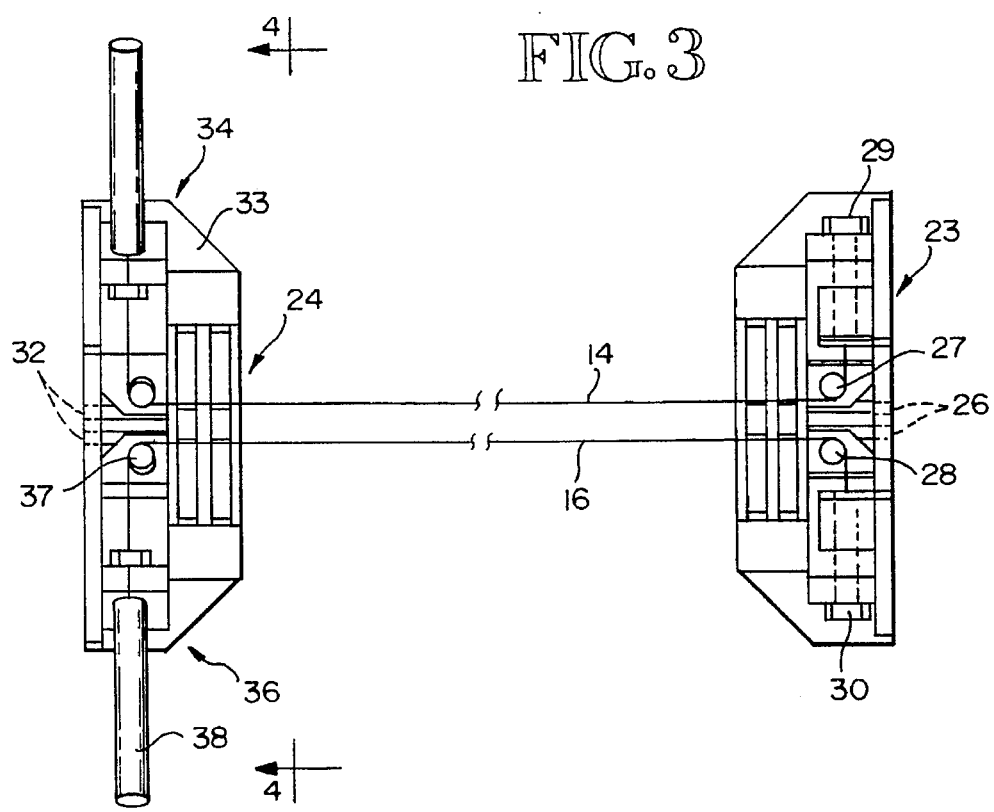
FIG. 3 is an elevational detail illustrating the reference wire tensioning apparatus.
Figure 4:
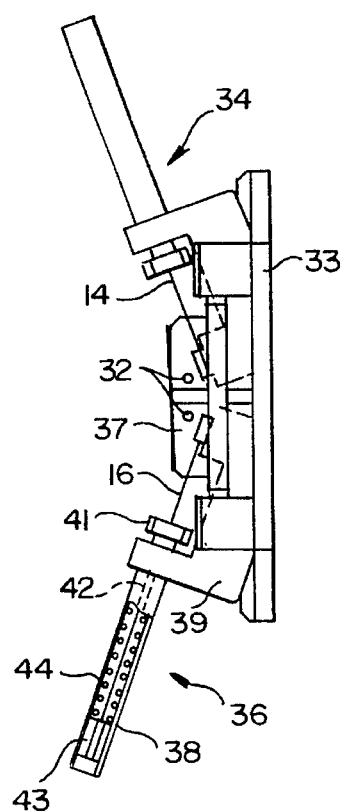
FIG. 4 is a side elevation of one end of the wire tensioning frame taken along lines 4—4 of FIG. 3.

Referring to FIGS. 3 and 4, the anchor plate 23 comprises an angular bracket, one face of which may be bolted or otherwise fixed to the frame section 6 via the bolt holes 26. The other face of the bracket 23 is provided with the posts or capstans 27 and 28 about which the wires 14 and 16 are respectively engaged. The wires are then connected to the anchor bolts 29 and 30 respectively to adjustably anchor the ends of the wires. The opposite ends of the wires are connected to the wire tensioning unit 24 at the opposite side of the frame. The wire tensioning unit 24 may also be in the form of an angle bracket with bolt holes 32 on one side for mounting the bracket to the O-frame section 4. The other leg of the bracket is in the form of a flat plate 33 which mounts oppositely facing spring tensioning units 34 and 36 to which the wires 14 and 16 are connected respectively for constant tensioning. The units 34 and 36 may be identical and only one will be described in detail with the understanding that they function in an identical manner. Each unit will include a post or capstan 37 and a rigidly mounted spring tube 38 with the axis of the spring tube being at right angles to the axis of the capstan 37. The tube 38 is fixed to an upstanding mounting arm 39 which includes an internally threaded bore for receiving the screw threaded tension adjustment bolt 41. The reference wire is passed about the post 37 and extends through a central bore 42 in the bolt 41 along the central axis of the tube 38. The reference wire is then anchored to the lug 43 which is slidably engaged in the tube. The lug seats against the compression or tension spring 44 located within the tube which in turn seats on the inner end of the adjustment bolt 42. With this arrangement, it will be seen that by rotation of the bolt 41, tension on the reference wires may be adjusted and held constant regardless of ambient temperature variations.

Although the preferred embodiment has been described utilizing the particular reference wire tensioning device it will be understood that any suitable apparatus for maintaining a constant tension on the reference wires may be utilized as long as it is substantially unaffected by temperature variation. The wire may be held under constant tension for instance by different types of spring tensioning units than the one described or may be held in constant tension by such means as counterweights. In some instances it may be possible to eliminate the spring means and utilize a reference wire which is initially tensioned and is substantially unaffected by temperature change.

Figure 5:
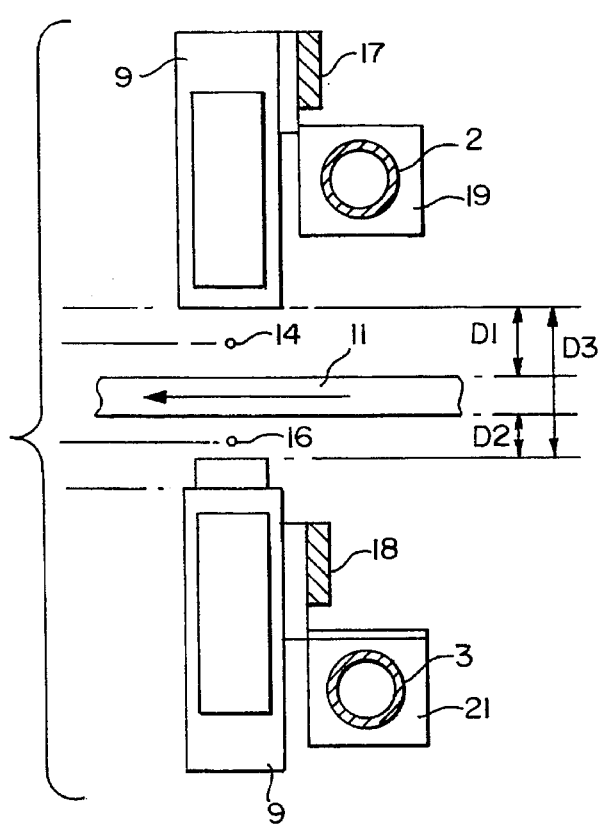
FIG. 5 is a schematic illustrating the relationship between the transducer heads, the reference wires and the product being monitored.

FIG. 5 is a schematic illustrating the positioning of the sensors and the reference wires relative to the material being monitored. In this case a panel or any form of web material 11 will be understood to be moving in the direction of the arrow in FIG. 5. The thickness of the product 11 is measured by subtracting the distance from the top transducer to the top of the product, D1, and the distance from the bottom transducer to the bottom of the product, D2, from a constant, D3, that represents the distance between the transducers at the time the measurement was taken. Since the distance between the transducers is not constant, however, because of thermal stress on the parallel rails 2 and 3, the reference wires 14 and 16 are used to introduce a source of constant reference.

To utilize the reference wires, the initial position of the wires 14 and 16 relative to the transducers or sensors 22 and the spacing of the parallel frame members 2 and 3 along the scanning path are "mapped" and stored in a signal processor. This can be done by fixing a target between the transducers and scanning across the O-frame. The distance from the transducer to each of the wires 14 and 16 can be measured in relation to the position of the transducers across the frame which is referred to as "wire mapping". Wire mapping can be simplified by mapping what the transducer reports as the wire "thickness" instead of the two distances mentioned. The wire "thickness" is actually the distance from the top of the top wire to the bottom of the bottom wire. This will provide a reference that can be checked later to see if the frame has moved. At the same time, any changes in target thickness as measured by the transducers can be attributed to the variation in frame spacing. Thus, using the target thickness at the home position as a reference, the changes in target thickness can be mapped in relation to the position of the transducer across the frame. This is referred to as "frame mapping". Later, when measuring an unknown product, this value, the change in target thickness (dependent upon the position of the transducer), can be subtracted from the thickness measurement to obtain a compensated thickness. It will be noted, that during normal operation, the transducers will be set to enable an "ignore" whenever it is measuring product thickness. This "ignore" causes the gauge to not report any data that come from objects within a certain distance of the end of the reference bar of the transducer. This means that the wire must be no more than the given distance away from the reference bar at any point in the scan. Otherwise it would incorrectly be detected as one of the surfaces of the product.

The implementation of the method of using the reference wires is as follows. The transducers measure the thickness of the product and measure the distance to the two wires or it can use the wire "thickness". The software or signal processor will then compare the distance to each of the wires (or the wire "thickness") with a value from the wire map for that position on the frame. If the distance to the wires has changed, then the thickness must be adjusted by that amount. At the same time a value from the frame map for that particular position on the frame can be subtracted from the thickness to compensate for frame irregularities. In this manner, the frame may be re-calibrated without attaching the reference target and without stopping the production of the user product.

The present invention has been described with respect to a preferred embodiment thereof and it will be realized that other embodiments are possible. For example the arrangement, number of sensors or transducers may be varied. The transducers may be mounted for independent scanning movement and may be driven for scanning by any means such as lead screws, drive belts, cables or chains. Alternatively, instead of reciprocation, the sensors may be mounted for rotary motion or may be fixed. Likewise different measuring systems may be used and different "fixture" configurations substituted. Similarly a reference member such as a thin ribbon or its equivalent may be substituted for the wire members disclosed. Thus, it will be understood by those of ordinary skill in the art that variations and modifications can be effected within the scope and spirit of the invention.

What is claimed is:

1. In combination with a frame for mounting sensor apparatus in fixed relation with an object to be sensed, said frame being subject to stress distortion, a constant reference comprising;

a thin elongated flexible reference member, mounting structure for positioning said reference member between said sensor in the sensing path thereof and the surface of the object and unaffected by stress distortion of said frame, adjustable tensioning apparatus for maintaining constant tension on said reference member, whereby said reference member remains in fixed position relative to the object independent of movement of said frame.

2. The combination of claim 1 wherein;

said frame comprises multiple spaced elements, said reference member being connected between spaced elements of said frame.

3. The combination of claim 2 wherein;

said frame comprises horizontal and vertical frame elements, said sensor apparatus being mounted on at least one of said horizontal elements, said reference member being connected between the vertical elements of the frame.

4. The combination of claim 3 wherein said frame comprises an O-frame, said object to be sensed being located between the members of said O-frame, said adjustable tensioning apparatus being mounted on one of said vertical frame elements, and said reference member comprising a reference wire connected at one end to said tensioning apparatus and at the other end to a second vertical element of said O-frame.

5. The combination of claim 4 wherein said sensor apparatus is mounted on horizontal elements of said O-frame above and below the object, said reference wire comprising a first reference wire located above said object and a second reference wire extending between said vertical frame elements below said object, said tensioning apparatus maintaining a constant tension on said first and second reference wires, said first and second reference wires being held a constant distance apart.

6. The combination of claim 5 wherein said object is located on a moving conveyor extending through said O-frame, said sensor apparatus comprising a scanning system including at least one pair of sensors, one sensor located above and the other sensor located below said object, said sensor pair comprising a thickness gauge, and carriage apparatus mounting said gauge on the horizontal elements of the O-frame for transverse reciprocation relative to the direction of travel of said conveyor.

7. The combination of claim 6 wherein said tensioning means comprises;

spring biasing means connected to said reference wires, and spring biasing adjustment means for adjusting the spring tension on said wires.

8. A method for compensating for sensor support frame stress distortion due to ambient stress conditions in a scanning system wherein the object being scanned by a sensor on said support frame is maintained a fixed distance from the frame, comprising the steps of;

extending a thin flexible reference element in fixed relation to the object and between the sensor and the object in a manner unaffected by stress distortion of the frame, maintaining a constant tension on said reference element sufficient to maintain a constant configuration of the reference element independent of ambient stress conditions, obtaining a first measurement of the distance between the sensor and the reference element under stress free conditions of the frame, obtaining a second measurement of the distance between the sensor and the reference member during frame stress conditions, comparing the first and second distance measurements to obtain a correction value, and applying the correction value to measurements made between the sensor and object during frame stress.

9. The method of claim 8 wherein;

said frame comprises a multiple member structure, said reference element comprises a reference wire extending between spaced members of said frame.

10. The method of claim 9 wherein;

said frame includes top and bottom horizontal sensor support members with top and bottom sensors located respectively above and below said object comprising a thickness gauge, said reference wire comprising a first reference wire located above the object, and including the steps of;

extending a second reference wire between spaced members of said frame and located below the object and between the bottom sensor and the object, and maintaining a constant distance between said reference wires, said correction value for both said sensors being applied to measurements made between the respective sensors and the object during frame stress.

11. The method of claim 10 wherein said correction value is obtained by establishing a constant which represents the distance between said sensors under stress free conditions, utilizing said constant to obtain a first wire thickness measurement comprising the distance between the top of the top reference wire and the bottom of the bottom reference wire under stress free conditions, utilizing said constant to obtain a second wire thickness measurement during frame stress, obtaining a correction value comprising the difference between said first and second wire thickness measurements, and applying said correction value to thickness measurements of said object during frame stress.

12. In combination with a support frame including mounting members for mounting sensor apparatus in fixed relation with an object to be sensed, said mounting members being subject to stress distortion due to ambient conditions, a constant reference comprising;

a thin elongated flexible reference member, mounting structure for positioning said reference member between said sensor in the sensing path thereof and the surface of the object to be sensed, tensioning means for maintaining constant tension on said reference member sufficient to maintain a constant configuration of the reference member independent of ambient conditions, whereby said reference member is unaffected by stress distortion and remains in fixed position independent of movement of said sensor mounting members.

13. The combination of claim 12 wherein;

said frame comprises multiple spaced elements, said reference member being connected between spaced elements of said frame.

14. The combination of claim 13 wherein;

said frame comprises horizontal and vertical frame elements, said sensor apparatus being mounted on at least one of said horizontal elements, said reference member being connected between the vertical elements of the frame.

15. The combination of claim 14 wherein said frame comprises an O-frame, said object to be sensed being located between the members of said O-frame, said tensioning means comprising apparatus mounted on one of said vertical frame elements, and said reference member comprising a reference wire connected at one end to said tensioning apparatus and at the other end to a second vertical element of said O-frame.

16. The combination of claim 15 wherein said sensor apparatus is mounted on horizontal elements of said O-frame above and below the object, said reference wire comprising a first reference wire located above said object and a second reference wire extending between said vertical frame elements below said object, said tensioning apparatus maintaining a constant tension on said first and second reference wires, said first and second reference wires being held a constant distance apart.

17. The combination of claim 16 wherein said object is located on a moving conveyor extending through said O-frame, said sensor apparatus comprising a scanning system including at least one pair of sensors, one sensor located above and the other sensor located below said object, said sensor pair comprising a thickness gauge, and carriage apparatus mounting said gauge on the horizontal elements of the O-frame for transverse reciprocation relative to the direction of travel of said conveyor.

18. The combination of claim 17 wherein said tensioning means comprises;

spring biasing means connected to said reference wires, and spring biasing adjustment means for adjusting the spring tension on said wires.

* * * * *

UNITED STATES PATENT AND TRADEMARK OFFICE
CERTIFICATE OF CORRECTION

PATENT NO. : 5,569,835
DATED : October 29, 1996
INVENTOR(S) : Martin J. Kenney; John K. Billings It is certified that error appears in the above-identified patent and that said Letters Patent are hereby corrected as shown below:

Column 2, line 52, change "are" to --and--

Signed and Sealed this

Eleventh Day of March, 1997

Attest:

BRUCE LEHMAN

Attesting Officer

Commissioner of Patents and Trademarks